United States Patent Office 3,475,479
Patented Oct. 28, 1969

3,475,479
PROCESS FOR PREPARING CYANOALKYL-PHOSPHINE
William J. Vullo, Tonawanda, N.Y., assignor to Hooker Chemical Corporation, Niagara Falls, N.Y., a corporation of New York
No Drawing. Filed July 30, 1965, Ser. No. 476,161
Int. Cl. C07c *121/28, 121/34;* C07f *9/02*
U.S. Cl. 260—465.8                11 Claims

ABSTRACT OF THE DISCLOSURE

Organic phosphines, such as tris(2-cyanoalkyl) phosphines, are made by reacting tetrakis(hydroxyalkyl) phosphonium halide with a vinyl cyanide and a base, in a liquid medium.

---

This invention relates to a method for producing organic phosphines and, in particular, to a method for preparing 2-cyanoalkyl phosphines. In accordance with the invention, 2-cyanoalkyl phosphines are made by the reaction of a tethakis (hydroxyalkyl) phosphonium halide, such as the chloride, with a vinyl cyanide, such as acrylonitrile, in the presence of a base.

It is known that organic phosphines, such as 2-cyanoethyl phosphines may be prepared by the reaction of phosphine with an appropriate olefinic compound, such as acrylonitrile. It is also known that tris (2-cyanoethyl) phosphine may be prepared from the reaction of tris (hydroxymethyl) phosphine and acrylonitrile. However, the properties of phosphine and tris (hydroxymethyl) phosphine make them difficult to handle. Both compounds are readily oxidized during normal handling in air and must normally be employed in an inert atmosphere. In addition, phosphine is flammable and highly toxic and thus, is hazardous to use.

It has now been found that 2-cyanoalkyl phosphines where the alkyl group is preferably a lower alkyl of 1 to 6 carbon atoms may be conveniently prepared by the reaction of tetrakis (hydroxyalkyl) phosphonium halide with a vinyl cyanide and a base. The vinyl cyanides which may be employed include those compounds having hydrogen or lower alkyl substituents of 1 to 4 carbon atoms on the vinyl carbons. Typical examples of such compounds are acrylonitrile; methacrylonitrile; ethylvinyl cyanide; propylvinyl cyanide; and butylvinyl cyanide. The preferred compound is acrylonitrile.

Preferably, the tetrakis (hydroxyalkyl) phosphonium halide is a chloride or bromide wherein the alkyl constituent is a lower alkyl of one to four carbon atoms, and most preferably, the reactant is tetrakis (hydroxymethyl) phosphonium chloride. The latter compound is commercially available, typically as an 80 percent aqueous solution. It can be safely and conveniently handled in air, either as a crystalline solid (melting point, 151 degrees centigrade), or in aqueous or non-aqueous solution. Other suitable phosphonium halides which may be employed include tetrakis(hydroxyethyl)phosphonium chloride, tetrakis(hydroxybutyl)phosphonium bromide, and tetrakis(hydroxypropyl)phosphonium chloride.

It is not intended to limit the present invention to a particular theory of reaction. However, the following equation is presented to illustrate the present invention in terms of the stoichiometry for a typical specific embodiment thereof:

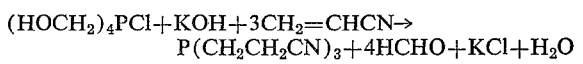

The 2-cyanoalkyl phosphines of the present invention may be employed as plasticizers or as insecticides. For example, tris (2-cyanoethyl) phosphine has been found useful as a plasticizer for polyacrylonitrile and as an intermediate for the preparation of other compounds.

Preferably, the reactants employed in the present method are employed in approximately stoichiometric amounts, for example, as illustrated by the above equation, to produce the desired product. However, the proportions of reactants may be varied if desired. For example, the ratio of phosphonium halide to vinyl cyanide may vary at least from .1 to 8 or more.

Among the bases which may be employed in the reaction of the present invention are included alkali metal hydroxides, oxides, carbonates, tertiary amines, quaternary ammonium hydroxides, and in general, any strong base which is capable of being ionized in aqueous solution. It will be apparent from the foregoing equation that the base functions as a reactant rather than as a catalyst and is consumed in the reaction in an amount proportional to the quantity of phosphonium halide employed. To obtain highest yields of the cyanoalkyl phosphine, it is preferred to employ the base in a mount about equivalent, on a molar basis, to the amount of tetrakis(hydroxyalkyl) phosphonium halide employed.

A reaction medium having a pH of between about 7 and 9 has been found most satisfactory. However, higher or lower values are permissible and the pH will depend on the proportion of base employed. Preferred ratios of base to phosphonium halide are between about 0.7 and 2. However, considerable variation is permissible and ratios ranging from less than .1 to greater than 5, are possible. However, the efficiency of the reaction decreases in terms of yield when ratios below about 1 are employed and no advantage is gained through the use of extremely high ratios, such as greater than 2.

The reaction is conveniently acomplished in either an aqueous or non-aqueous medium. Suitable media include, for example, water; non-aqueous liquids such as methyl alcohol, ethyl alcohol, isopropyl alcohol, dimethylformamide, acetonitrile; and mixtures of water and a non-aqueous liquid. Preferably, an aqueous medium is employed. The reaction time will normally be from less than a minute to more than an hour depending on temperature, proportions of reactants and other reaction conditions. The cyanoalkyl phosphines are substantially insoluble in water and may be conveniently recovered by filteration, either in a batch or continuous process. The order of addition of the reactants is not critical nor is the method of addition. The starting materials may be added to the reaction medium in any convenient manner, for example, in the solid state or in solution. The reaction is exothermic and it has been found desirable to control the reaction temperature, preferably to below about 50 degrees centigrade, to avoid too vigorous a reaction and the possibility of volatilizing reaction constituents. The temperature may be conveniently controlled by employing a relatively slow rate of addition of reactants or by cooling the reaction medium.

By way of further illustrating the present invention and the manner in which it may be practiced, the following specific examples are set forth. In the examples all parts are by weight and all temperatures are in degrees centigrade unless otherwise indicated.

EXAMPLE 1

To 75 parts of commercial denatured ethanol (containing 2 percent benzene as a denaturing agent) were added 79.3 parts of an aqueous solution of 80 percent tetrakis (hydroxymethyl) phosphonium chloride. The reaction system was flushed with nitrogen and a solution consisting of 19.6 parts of 86 percent potassium hydroxide and 20 parts of water was added. During the addition the reaction mixture was stirred and cooled to maintain the temperature in the range of 20 to 30 degrees centigrade. After the addition of the potassium hydroxide solution, the pH of the reaction medium was 7.5. Next, 58.2 parts of acrylonitrile were slowly added while the reaction mixture was cooled to maintain a temperature in the range of 35 to 40 degrees centigrade. Following the acrylonitrile addition, the mixture was stirred for about eight hours under a nitrogen atmosphere and allowed to stand for an additional nine hours, without stirring, under a nitrogen atmosphere. The reaction mixture was filtered and the resultant filter cake, consisting primarily of tris(2-cyanoethyl)phosphine, was washed three times with 75 part portions of water to remove impurities, and dried in vacuum. A yield of 49.8 parts of tris (2-cyanoethyl) phosphine having a melting range of 95.8 to 97 degrees centigrade was obtained. The product represented a 78 percent yield, based on the amount of tetrakis (hydroxymethyl) phosphonium chloride employed.

Following the general procedure of the above example, when tetrakis (hydroxymethyl) phosphonium chloride is replaced by an equal number of moles of tetrakis (hydroxypropyl) phosphonium bromide, comparable results are obtained.

EXAMPLE 2

A solution of 11.9 parts of an 80 percent aqueous solution of tetrakis (hydroxymethyl) phosphonium chloride and 11.4 parts of a 21.5 percent aqueous solution of potassium hydroxide was placed in an open, water-cooled reaction vessel. The pH of the solution was about 8. The solution was cooled and stirred while 8 parts of acrylonitrile were slowly added at atmospheric conditions. During the addition of the acrylonitrile, the pH rose to about 10 and the temperature to a maximum of about 45 degrees centigrade. The reaction mixture was stirred for an additional forty-five minutes, during which time the temperature decreased to room temperature (about 20 degrees centigrade) and a heavy white precipitate formed. The mixture was diluted with cold water, at about 20 degrees centigrade and the product collected by filtration, washed with water, and dried in vacuum. The reaction yielded 4.2 parts of tris (2-cyanoethyl) phosphine (melting range 94 to 96 degrees centrigrade), representing a 43.5 percent yield based on the tetrakis (hydroxymethyl) phosphonium chloride.

When the general procedure of Example 2 is repeated, except that acrylonitrile is replaced with an equal number of moles of 1-ethylvinyl cyanide, the compound tris (2-cyanobutyl) phosphine is obtained.

The importance of the presence of a base in the reaction of the present invention is indicated by the following experiment.

EXAMPLE 3

A mixture of 58.2 parts of acrylonitrile and 20 parts of water was gradually added to a solution of 79.3 parts of an 80 percent aqueous solution of tetrakis (hydroxymethyl) phosphonium chloride and 15 parts of commercial denatured ethanol. No heat was evolved. The solution was allowed to stand for several hours at room temperature and divided into two equal portions. One portion was distilled at atmospheric pressure using a 7 inch vacuum-jacketed Vigreaux column. The distillation afforded a quantitative recovery of the acrylonitrile in the form of a water azeotrope. The other portion of the original mixture was diluted with 75 parts of ice water and cooled in an ice bath. No precipitation occurred. However, on the addition of 10 percent aqueous sodium hydroxide in an amount sufficient to result in a pH above 7, tris (2-cyanoethyl) phosphine precipitated. The precipitate was recovered by filtration and dried in vacuum. The yield of tris (2-cyanoethyl) phosphine was 11.1 parts, a yield of 35 percent, based on the tetrakis (hydroxymethyl) phosphonium chloride.

When the sodium hydroxide is replaced by potassium carbonate in the procedure of Example 3, comparable results are obtained.

To evaluate the effects of various amounts of base in the reaction of the present invention, the following procedures were carried out:

EXAMPLE 4

A solution was prepared consisting of 31.8 parts of acrylonitrile, 47.6 parts of an 80 percent aqueous solution of tetrakis (hydroxymethyl) phosphonium chloride and 25.0 parts of a commercial denatured ethanol. This was divided into four equal portions and each was placed in a different reactor. Aqueous 10 percent sodium hydroxide was added to each reactor as follows: reactor 1, 5.0 parts; reactor 2, 10.0 parts; reactor 3, 20.0 parts; reactor 4, 30.0 parts. The pH, heat of reaction and time before a precipitate began to form, were noted. After stirring for about an hour at about 10 degrees centigrade and about 2.5 hours at 25 to 30 degrees centigrade, 50 parts of cold water were added to each reactor and the precipitates were collected by filtration. The filter cakes were washed three times with cold water, dried at 55 degrees centigrade and weighed. The filtrates were saved and observed the next day. No further precipitation had occurred. The results are summarized below:

| Reactants | Reactor 1 | Reactor 2 | Reactor 3 | Reactor 4 |
|---|---|---|---|---|
| Moles acrylonitrile | 0.150 | 0.150 | 0.150 | 0.150 |
| Moles tetrakis (hydroxymethyl) phosphonium chloride | 0.050 | 0.050 | 0.050 | 0.050 |
| Moles NaOH | 0.0125 | 0.025 | 0.050 | 0.075 |
| Reaction Conditions: | | | | |
| Heat of reaction noted | Slight | Slight | Moderate | Vigorous. |
| pH (approximate) | 7 | 7.5 | 9 | 10. |
| Time until precipitate began to form | About 1 hour | About 20 min | About 5 min | Immediate. |
| Yield of tris (2-cyanoethyl) phosphine: | | | | |
| Parts by weight | 1.2 | 2.3 | 5.5 | 5.7. |
| Percent (based on phosphonium halide) | 12.4 | 24.0 | 57 | 59. |

From the data of Example 4 it is concluded that the yield is proportional to the amount of base employed up to about an amount of base equivalent (molar basis) to the amount of phosphonium halide. Larger amounts of base may be employed if desired, with little, if any, increase in yield.

EXAMPLE 5

Twenty-four parts of commercial denatured ethanol were mixed with 22.8 parts of an aqueous solution containing 80 percent by weight tetrakis (hydroxymethyl) phosphonium chloride. The resulting solution was stirred and cooled by means of an ice bath while a solution of 6.5 parts of 86 percent potassium hydroxide in 20 parts of distilled water was added. After stirring for an additional 15 minutes, 6.7 parts of acrylonitrile were added. The reaction temperature rose from 7 degrees centigrade to 15 degrees centigrade and then subsided. The ice bath was removed and the reaction mixture was stirred for 3 hours at ambient temperature and then poured into 60 parts of cold water. A white precipitate formed, was collected by filtration, washed once with cold water and dried on a porous plate. The dried product was tris (2-cyanoethyl) phosphine (melting range 91–94 degrees centigrade) in an amount of 1.85 parts, a 29 percent yield based on the amount of acrylonitrile employed. To facilitate characterization of the remaining product it was oxidized to convert the remaining phosphines to the corresponding phosphine oxide. Thus, the combined filtrate and water wash was oxidized with aqueous 30 percent hydrogen peroxide at 25 to 40 degrees centigrade until a slight excess of peroxide was detected by a starch-iodide paper test. The oxidized product was then concentrated in vacuum to a viscous, salty syrup. The syrup was then separated from the potassium chloride salt by dissolution in denatured ethanol and filtration. The yield of dry potassium chloride was 7.32 parts, 98 percent of theory. The filtrate was concentrated in vacuum at temperatures not exceeding 40 degrees centigrade and pressures as low as 0.1 millimeter of mercury for 18 hours yielding 16.2 parts of a clear nearly colorless syrup. Analytical samples of the syrup were dried by heating for about 20 hours at 40 degrees centigrade and 0.1 millimeter of mercury over $P_2O_5$ with a loss in weight of about 1.71 percent. An infrared spectrum of the material showed bands characteristic of saturated alkyl nitrile at 4.42 microns (medium intensity); alcoholic hydroxyl at 3.04 microns (strong intensity); and phosphine oxide at 8.7 microns (strong intensity). Analysis of the product indicated a P to N ratio of 1.0 to 1.0, corresponding to mono(2-cyanoethyl)di(hydroxymethyl) phosphine.

EXAMPLE 6

Crystalline tetrakis (hydroxymethyl) phosphonium chloride (38.1 parts) was dissolved in 200 parts of commercial denatured ethanol and the solution was stirred while 31.8 parts of acrylonitrile were added, with no apparent reaction. A solution of 20.2 parts of triethylamine in 50 parts of denatured ethanol was added. The reaction temperature gradually rose from 26 degrees centigrade to a maximum of 45 degrees centigrade during a 20 minute period and then gradually declined. No external cooling was employed. During cooling tris (2-cyanoethyl) phosphine precipitated as a white crystalline solid and was collected. The yield of tris (2-cyanoethyl) phosphine (melting range 92.5–94.2 degrees centigrade) was 21 parts, a 55 percent yield based on the amount of tetrakis (hydroxymethyl) phosphonium halide.

It will be apparent to those skilled in the art that many variations and modifications of the present invention may be made without departing from the spirit and scope of the invention. The invention is not to be construed as being limited to the examples given.

I claim:
1. A method for preparing a cyanoalkyl phosphine which comprises reacting tetrakis (hydroxyalkyl) phosphonium chloride or bromide, in which the alkyl is of one to six carbon atoms, with a vinyl cyanide, having hydrogen or alkyl of 1 to 4 carbon atoms on the vinylic carbon atoms, and a base which is ionizable in an aqueous medium, the reaction being conducted in a liquid medium at a temperature up to the volatilization temperature of the chloride or bromide, cyanide and base reactants, and the molar proportions of such reactants being from 0.1 to 8 of phosphonium chloride or bromide to vinyl cyanide and 0.1 to 5 of base to phosphonium chloride or bromide.

2. A method according to claim 1 wherein said phosphonium chloride or bromide is tetrakis (hydroxymethyl) phosphonium chloride or bromide.

3. A method according to claim 1 wherein said vinyl cyanide is acrylonitrile.

4. A method according to claim 1 wherein said base is an alkali metal hydroxide.

5. A method according to claim 4 wherein the molar amount of said alkali metal hydroxide is at least equivalent to the molar amount of said phosphonium chloride or bromide.

6. A method for preparing tris (2-cyanoethyl) phosphine which comprises bringing together in an inert solvent, tetrakis (hydroxymethyl) phosphonium chloride, acrylonitrile and a base, which is ionizable in water, at a reaction temperature up to about 50° C., the molar ratio of base to phosphonium chloride being within the range of 0.7 to 2.

7. A method according to claim 6 wherein the molar ratio of acrylonitrile to tetrakis (hydroxymethyl) phosphonium chloride is at least about 3.

8. A method according to claim 7 wherein said inert solvent is an aqueous medium and said base is an alkali metal hydroxide.

9. A method according to claim 8 wherein the ratios of reactants employed are approximately stoichiometric.

10. A method according to claim 9 wherein said alkali metal hydroxide is potassium hydroxide.

11. A method according to claim 9 wherein said alkali metal hydroxide is sodium hydroxide.

References Cited

UNITED STATES PATENTS

| | | | |
|---|---|---|---|
| 3,005,013 | 10/1961 | Grayson et al. | 260—465.8 X |
| 3,116,317 | 12/1963 | Grayson et al. | 260—465.8 X |
| 3,214,434 | 10/1965 | Grayson et al. | 260—465.8 X |
| 3,243,450 | 3/1966 | Grayson | 260—465.6 |

JOSEPH P. BRUST, Primary Examiner

U.S. Cl. X.R.

260—465.6, 606.5